United States Patent
Uroz Soria et al.

(10) Patent No.: US 8,767,277 B2
(45) Date of Patent: Jul. 1, 2014

(54) PRINTER CALIBRATION USING MEASURED AND DETERMINED OPTICAL DENSITIES OF DIFFERENT PRIMARY COLORS FROM TEST PATCHES

(71) Applicant: Hewlett-Packard Development Company, L.P., Houston, TX (US)

(72) Inventors: Juan Uroz Soria, Sant Cugat del Valles (ES); Jacint Humet Pous, Sant Cugat del Valles (ES); Miguel Angel Lopez Alvarez, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 74 days.

(21) Appl. No.: 13/678,756

(22) Filed: Nov. 16, 2012

(65) Prior Publication Data
US 2014/0139850 A1    May 22, 2014

(51) Int. Cl.
*H04N 1/60* (2006.01)
(52) U.S. Cl.
USPC .......................................... 358/521; 358/504
(58) Field of Classification Search
None
See application file for complete search history.

(56) References Cited

U.S. PATENT DOCUMENTS

| | | | |
|---|---|---|---|
| 5,838,465 A * | 11/1998 | Satou et al. | 358/520 |
| 6,072,464 A | 6/2000 | Ozeki | |
| 6,082,911 A * | 7/2000 | Murakami | 347/19 |
| 6,262,810 B1 * | 7/2001 | Bloomer | 358/504 |
| 6,480,625 B1 | 11/2002 | Yamazaki | |
| 7,154,634 B2 * | 12/2006 | Hung | 358/504 |
| 7,515,267 B2 | 4/2009 | Ehbets et al. | |
| 8,559,056 B2 * | 10/2013 | Lei | 358/518 |
| 8,665,492 B2 * | 3/2014 | Toriyabe | 358/520 |
| 2011/0043556 A1 | 2/2011 | Ihme et al. | |
| 2011/0282613 A1 | 11/2011 | Skinner et al. | |
| 2012/0050771 A1 * | 3/2012 | Sakatani | 358/1.9 |

OTHER PUBLICATIONS

Densitometry and Spectrophotometry, (Research Paper).

* cited by examiner

*Primary Examiner* — Scott A Rogers
(74) *Attorney, Agent, or Firm* — Steven L. Webb (57) ABSTRACT

The optical density of a first primary color is determined using two test patches. The first patch is printed with only the first primary color and a second primary color. The second patch is printed using the first primary color and a second primary color. The optical density of both patches is measured. The optical density of the first primary color is determined using the measured optical density of the second primary color and the measured optical density of the first patch.

14 Claims, 6 Drawing Sheets

PRINTER CALIBRATION USING MEASURED AND DETERMINED OPTICAL DENSITIES OF DIFFERENT PRIMARY COLORS FROM TEST PATCHES

BACKGROUND

The colors printed by a color printer can change for a number of reasons, such as changing printing conditions or the time between print jobs. Most color printers can be calibrated such that the colors printed under the current condition match the desired colors.

DETAILED DESCRIPTION

Figure 1:
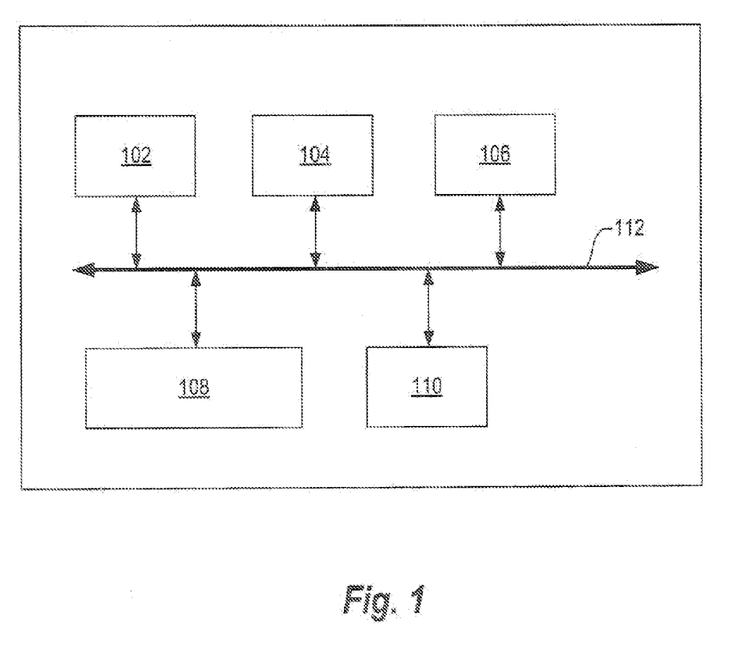
FIG. 1 is a block diagram of an example printer.

FIG. 1 is a block diagram of an example printer. Printer comprises a processor 102, memory 104, input/output (I/O) module 106, print engine 108 and controller 110 all coupled together on bus 112. In some examples printer may also have a display, user interface module, an input device, and the like, but these items are not shown for clarity. Processor 102 may comprise a central processing unit (CPU), a microprocessor, an application specific integrated circuit (ASIC), or a combination of these devices. Memory 104 may comprise volatile memory, non-volatile memory, and a storage device. Memory 104 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 106 is used to couple printer to other devices, for example the Internet or a computer. Print engine 108 may comprise a media supply system, one or more printheads, an optical sensor to measure ink placed on the media, an ink supply system, and the like. Printer has code, typically called firmware, stored in the memory 104. The firmware is stored as computer readable instructions in the non-transitory computer readable medium (i.e. the memory 104). Processor 102 generally retrieves and executes the instructions stored in the non-transitory computer-readable medium to operate the printer. In one example, processor executes code that directs controller 110 to calibrate the printer.

Figure 2:
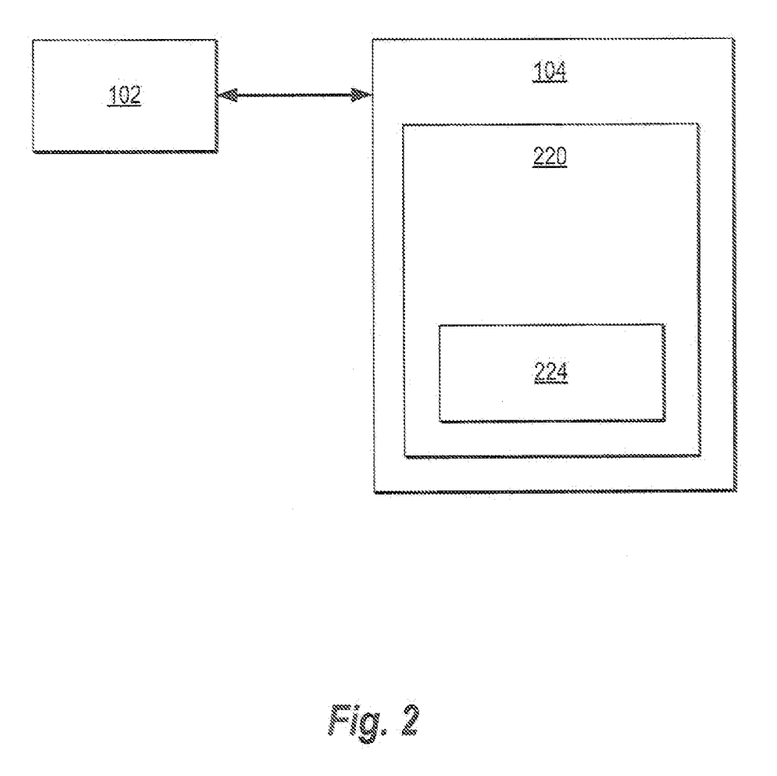
FIG. 2 is an example block diagram of the processor coupled to memory.

FIG. 2 is an example block diagram of the processor 102 coupled to memory 104. Memory 104 contains firmware 220. Firmware 220 contains a calibration module 224. The processor 102 executes the code in calibration module 224 to direct controller 110 to calibrate the printer. In one example, the printer calibration module causes the printer to print a number of color patches. Typically patches for each primary color will be printed. Each primary color will have a number of patches printed with varying amounts of ink. These are typically called color ramps. The primary colors for most printers are cyan, yellow, magenta and black (CYMK).

The color patches are scanned using an optical sensor to determine the optical density of each patch. The measured optical density is compared to the expected optical density. The difference between the measured density and expected density is used to adjust the printer parameters to cause the printed patches to more closely match the expected density.

In some printers a low cost LED-based, densitometer is used as the optical sensor. The LED-based densitometer typically has 4 different colored LEDs used to test/measure the densities of the different color test patches. Some of these low cost densitometers suffer from poor intra-instrument repeatability on some of the color patches. This is caused when the reflectance curve for the color patch is not flat over the wavelength band of the LED used for testing that color, and the center wavelength of the LED shifts.

Figure 3A:
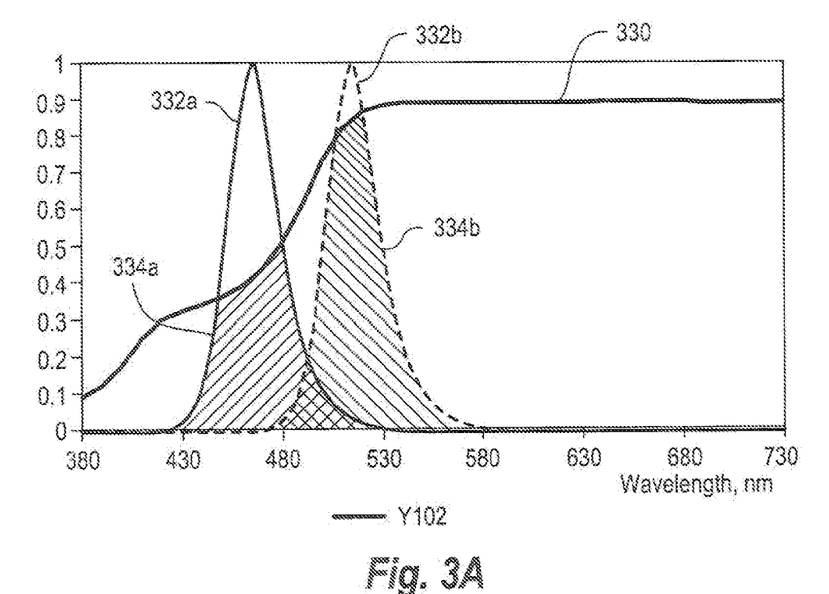
FIG. 3A is at example graph of a reflectance curve for a color patch.

FIG. 3A is an example graph of a reflectance curve for a color patch. The graph has the wavelength of light, in nm, as the horizontal axis and the normalized optical density as the vertical axis. Curve 330 is the reflectance curve of a yellow patch (i.e. a patch printed with yellow ink). Curve 332a is the spectral output of a Blue LED in an optical densitometer. The reflectance curve for the yellow ink patch has a steep slope through the area where the blue LED emits light (i.e. the curve is not horizontally flat). Hatched area 334a is proportional to the measured optical density of the yellow patch as measured by the Blue LED.

Curve 332b is the spectral output of a Blue LED with a shifted center wavelength. The magnitude of the wavelength shift between the blue LEDs has been exaggerated for demonstration purposes. Hatched area 334b is proportional to the measured optical density of the yellow patch as measured by the Blue LED with the shifted center wavelength. Hatched area 334a is significantly different than hatched area 334b. Therefore the measured optical density of the yellow ink patch will be different when using the two different blue LEDs. The shift in the wavelength band of the Blue LED causes a measurement error for the yellow color patch.

Figure 3B:
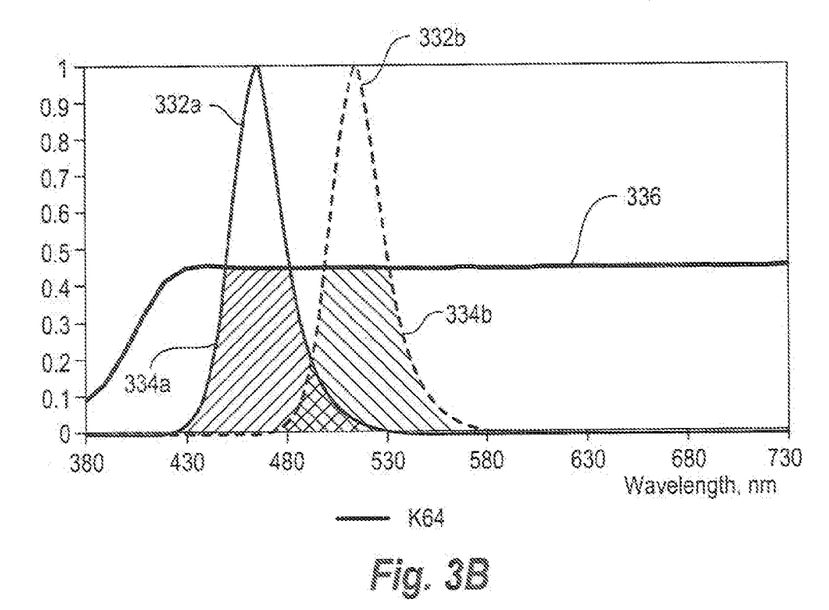
FIG. 3b is another example graph of a reflectance curve for a color patch.

FIG. 3b is another example graph of a reflectance curve for a color patch. The graph has the wavelength of light, in nm, as the horizontal axis and the normalized optical density as the vertical axis. Curve 336 is the reflectance curve of a black (K) patch (i.e. a patch printed with black ink). Curve 332a is the spectral output of the Blue LED in an optical densitometer. Hatched area 334a is proportional to the measured optical density of the black patch as measured by the Blue LED. Curve 332b is the spectral output of a Blue LED with a shifted center wavelength. Hatched area 334b is proportional to the measured optical density of the black patch as measured by the Blue LED with the shifted center wavelength. Hatched area 334a is the same as hatched area 334b because the reflectance curve of the black patch is flat across the wavelength bands of the two Blue LEDs. The shift in the wavelength band of the Blue LED does not cause a measurement error of the optical density of the black color patch.

The shift in the center wavelength or wavelength band of an LED may be caused by a number of factors. One factor is the manufacturing tolerance between different LEDs. If one densitometer becomes damaged and is replaced by another densitometer, the wavelength bands of the LEDs in the new densitometer may be different than the wavelength bands in the original densitometer. Another factor is the operating conditions of the LEDs. For example, changes in the LED operating current can cause shifts in the wavelength bands of the LEDs.

The measurement errors caused by shifting LED wavelengths only occur in colors that have non-flat reflectance curves across the wavelength band of the LED used to measure that color. In general yellow ink is the color that is the most sensitive to shifts in the wavelength band of the LED used to measure yellow ink. Magenta is the next sensitive, with cyan and black ink being the least sensitive to color shifts in the LEDs used to measure that color.

To overcome the problem of the wavelength shift in the LED, the test patches for yellow ink are printed using an additional primary color. The addition of the second primary color to the yellow ink patches is used to flatten the reflectance curve of the patch around the wavelength band of the LED used to test yellow ink. In one example the patches used to measure yellow ink are printed with a combination of yellow ink and magenta ink.

Figure 4:
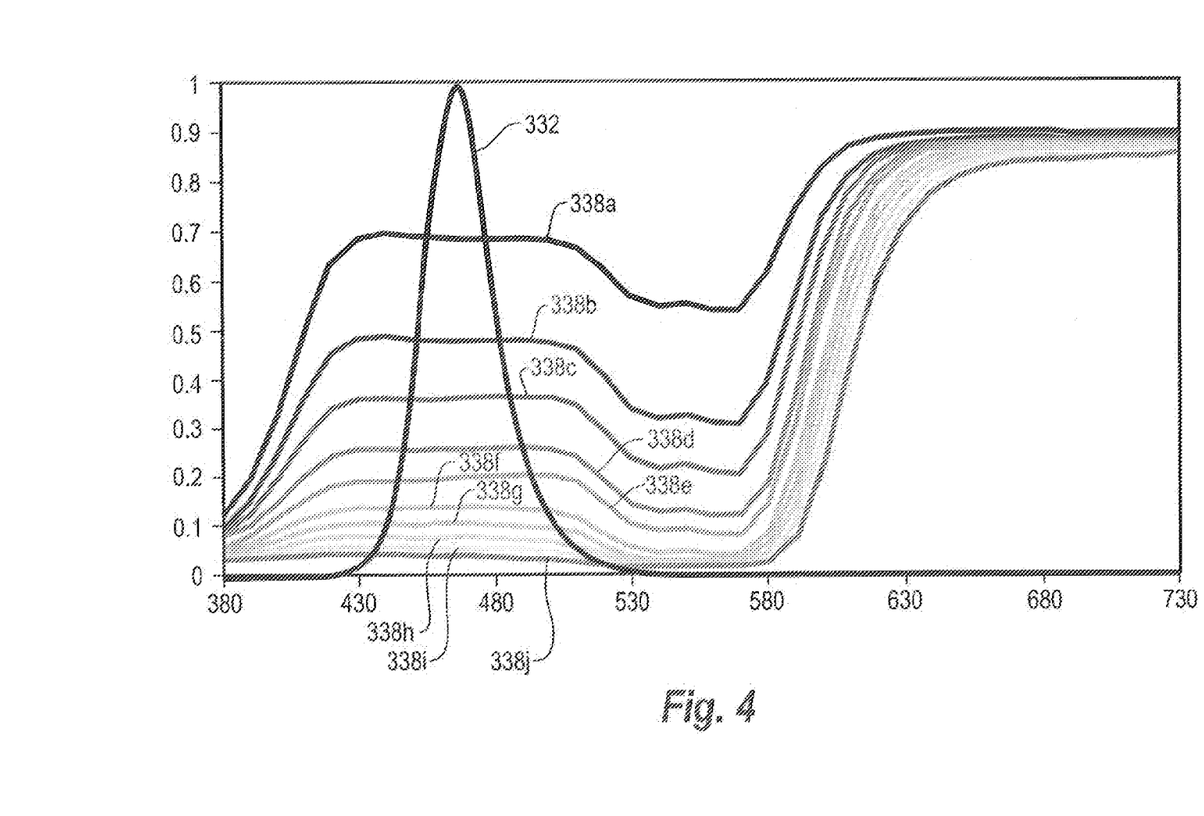
FIG. 4 is an example graph of a set of reflectance curves for a set of color patches printed with two different primary colors.

FIG. 4 is an example graph of a set of reflectance curves for a set of color patches printed with two different primary colors. The graph has the wavelength of light, in nm, as the horizontal axis and the normalized optical density as the vertical axis. Curves 338a-338j are the reflectance curves of a set of red ink patches that were printed using combinations of yellow and magenta ink. Curve 332 is the spectral output of a Blue LED in an optical densitometer. As can be seen in the graph, the reflectance curve for the red ink patches are flat across the wavelength band of the blue LED. In this application when the variance of a reflectance curve over a wavelength band is less than 10%, the reflectance curve will be considered flat across that wavelength band.

The reflectance curves 338a-338j are for color patches printed with a combination of yellow and magenta ink. The amount of ink for each color is represented by a value normalized to 255. For example, a patch printed with a maximum amount of yellow ink and the middle amount of magenta ink would be represented as Y255M128. The amount of ink used for each patch is listed in the table below:

| Curve 338a | Y16 M48 |
| Curve 338b | Y32 M96 |
| Curve 338c | Y48 M128 |
| Curve 338d | Y64 M160 |
| Curve 338e | Y80 M176 |
| Curve 338f | Y96 M192 |
| Curve 338g | Y112 M208 |
| Curve 338h | Y128 M224 |
| Curve 338i | Y144 M240 |
| Curve 338j | Y160 M255 |

Compare the reflectance curves for the red patches (338a-338j) in FIG. 4 with the reflectance curve 310 for a yellow patch shown in FIG. 3A. Curves 338a-338j are much flatter across the wavelength band of the blue LED than curve 330. By flatting the reflectance curve of the tested ink patch around the wavelength band of the LED used to measure patch, the sensitivity to shifts in the LED wavelength band has been reduced.

When using a patch printed with two primary colors to determine the optical density of one of the primary colors, a test patch printed with only the other primary color is also used. For example, when printing a patch using yellow and magenta ink (a red patch) to flatten the reflectance curve of the yellow ink, a patch using only magenta is also printed. The optical density of the yellow ink is determined using the measured optical density of the red patch in combination with the measured optical density of the magenta patch. In one example a lookup table is used to determine the optical density of the yellow ink. The lookup table has two inputs and one output. The two inputs are the measured optical density of the magenta patch and the measured optical density of the red patch (the patch printed with both yellow and magenta ink). The lookup table is created in the factory and loaded into each printer.

Figure 5:
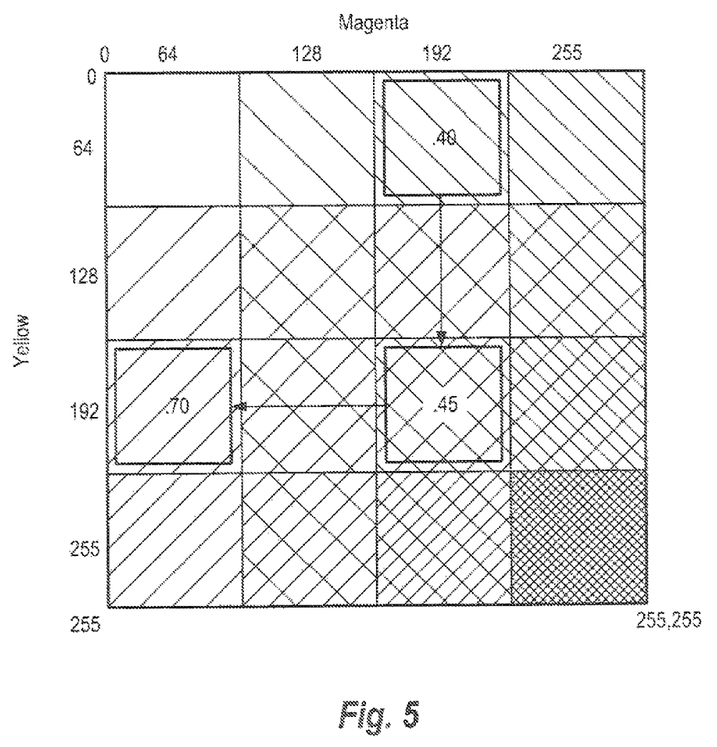
FIG. 5 is an example target with a drastically reduced number of patches for clarity.

In one example the lookup table is created by printing a target with all possible combinations of quantities of Magenta ink and Yellow ink, from 0 to 255 in fixed small increments. FIG. 5 is an example target with a drastically reduced number of patches for clarity. In practice the incremental amount of ink between each patch could be as small a 1/256ths. In the target shown in FIG. 5, the amount of magenta ink for each patch increases in the horizontal axis, starting at zero along the left edge of the target. The amount of yellow ink for each patch varies along the vertical axis, starting with zero yellow ink along the top edge of the target. Therefore the bottom right patch in the target has the maximum amount of both yellow and magenta ink and the top left patch has no yellow or magenta ink.

Once the target is printed, the optical density of each patch is measured with the same type of densitometer used in the printer. Using the measured optical density for each patch and the known amount of ink printed in each patch, the lookup table can be created. In this example the optical density for only three patches are shown (for clarity). To use the table, the measured optical density of the pure magenta patch and the measured optical density of the red patch are used as inputs, which will determine the optical density for a pure yellow patch. For example, if the measured optical density of the pure magenta patch is 0.40 and the measured optical density of the red patch is 0.45, the determined optical density of a pure yellow patch would be 0.70 (see FIG. 5). In one example, a lookup table will be created for each type of media that will be used in the printer.

Figure 6:
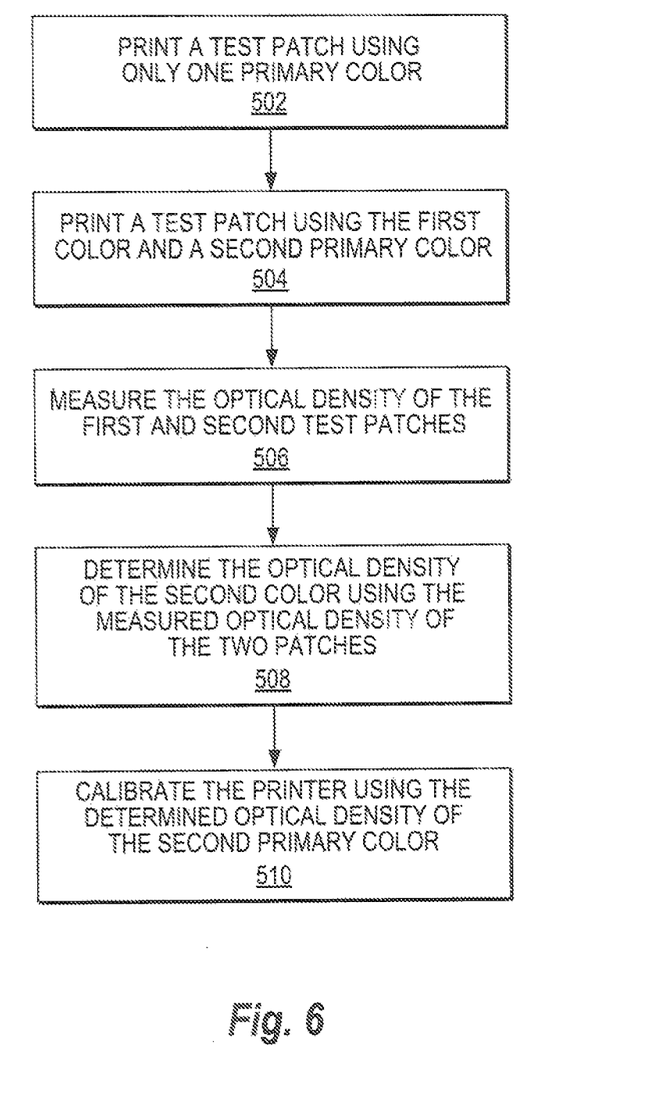
FIG. 6 is an example flow chart of a method for calibrating a printer.

Once the optical densities of the different primary colors are measured or determined, the printer can be calibrated using the difference between the measured optical densities and the expected optical densities and the media type used. FIG. 6 is an example flow chart of a method for calibrating a printer. Flow starts at step 602 where a first test patch is printed using only one primary color, for example magenta. The primary color used to print the first test patch will be called the first primary color. In some examples, a series of patches with different amounts of the first primary color are printed. A series of targets with different amounts of ink, or different saturation levels, is sometimes called a ramp. At step 604 a second test patch is printed using two primary colors, for example yellow and magenta. The second test patch will be printed using the first primary color (from step 602) and a second primary color. In some examples a ramp of the second test patch is printed. The order in which the test patches are printed can be reversed, or both patches may be printed at the same time.

At step 606 the optical density of the two patches (from steps 602 and 604) are measured. At step 608 the measured optical density of the first primary color and the measured optical density of the second patch are used to determine the optical density of the second primary color. At step 610 the measured optical density of the first primary color and the determined optical density of the second primary color are used to calibrate the printer. In some examples, test patches are printed for each of the other two remaining primary colors, for example cyan and black. The optical densities of these patches are also measured and used in the calibration of the printer. In other examples black patches may not be used as part of the calibration process.

What is claimed is:

1. A method, comprising:
printing a first test patch using only a first primary color;
printing a second test patch using both the first and a second primary color;
measuring an optical desity of the first and second test patches;
determining an optical density of the second primary color using the measured optical density of the first and second test patches
calibrating a printer based on the measured optical density of the first primary color and the determined optical density of the second primary color.

2. The method of claim 1, wherein the first primary color is magenta and the second primary color is yellow.

3. The method of claim 1, further comprising:
printing the second test patch using a first amount of the second primary color;
measuring the optical density of the second test patch using a first wavelength band; and
wherein a reflectance curve of the second test patch is flatter over the first wavelength band than a reflectance curve of a patch printed with only the first amount of the second primary color.

4. The method of claim 1, further comprising:
printing a third test patch using a third primary color;
printing a fourth test patch using a fourth primary color;
measuring the optical density of the third and fourth test patches; and
calibrating the printer using a difference between an expected optical density of the third and fourth primary colors and the measured optical density of the third and fourth primary colors.

5. The method of claim 4, wherein the first primary color is magenta, the second primary color is yellow, the third primary color is cyan and the fourth primary color is black.

6. The method of claim 1, wherein the optical density of the second primary color is determined using a lookup table having the measured optical density of the first test patch as a first input and the measured optical density of the second test patch as a second input and the optical density of the second primary color is the output of the lookup table.

7. The method of claim 6, wherein the lookup table used to determine the optical density of the second primary color is selected from a plurality of lookup tables, where each of the plurality of lookup tables is created for a type of media and the lookup table selected from the plurality of lookup tables matches the media type used to print the first and second test patches.

8. A printer, comprising:
a processor;
a print engine coupled to the processor, the print engine having ink with at least three different primary colors;
memory coupled to the processor, the memory containing computer readable instructions that, when executed by the processor cause a calibration module (CM) to calibrate the printer;
the CM to print at least a first test patch using only a first primary color;
the CM to print at least a second test patch using the first primary color and a second primary color;
the CM to print at least a third test patch using only a third primary color;
the CM to measure the optical density of the at least first test patch, the at least second test patch and the at least third test patch;
the CM to determine an optical density of the second primary color using the measured optical density of the at least first test patch and the at least second test patch;
the CM to calibrate the printer using the measured optical density of the first and third primary colors and the determined optical density of the second primary color.

9. The printer of claim 8, further comprising:
the CM to print at least a fourth test patch using only a fourth primary color;
the CM to measure the optical density of the at least fourth test patch;
the CM to calibrate the printer using the measured optical density of the first, third and fourth primary colors and the determined optical density of the second primary color.

10. The printer of claim 8, wherein the first primary color is magenta, the second primary color is yellow and the third primary color is cyan.

11. The printer of claim 8, further comprising:
the CM to print at least a fourth test patch using only a fourth primary color;
the CM to measure the optical density of the at least fourth test patch;
the CM to calibrate the printer using the measured optical density of the first, third and fourth primary colors and the determined optical density of the second primary color.

12. The printer of claim 8, further comprising:
a densitometer in the print engine, the densitometer having at least one LED, the at least one LED emitting light over a first wavelength band; and
wherein the reflectance curve of the at least second test patch across the first wavelength band is flat.

13. The printer of claim 8, wherein the CM determines the optical density of the second primary color using a lookup table.

14. The printer of claim 13, wherein the CM selects the lookup table from a plurality of lookup tables based on a media type.

* * * * *

UNITED STATES PATENT AND TRADEMARK OFFICE
CERTIFICATE OF CORRECTION

PATENT NO. : 8,767,277 B2
APPLICATION NO. : 13/678756
DATED : July 1, 2014
INVENTOR(S) : Juan Uroz Soria et al.

It is certified that error appears in the above-identified patent and that said Letters Patent is hereby corrected as shown below:

In the Claims

In column 5, line 10, in Claim 1, delete "desity" and insert -- density --, therefor.

Signed and Sealed this
Second Day of June, 2015

Michelle K. Lee
*Director of the United States Patent and Trademark Office*